W. J. SCRIMSHAW.
TROLLEY CATCHER AND REPLACER.
APPLICATION FILED FEB. 14, 1910. RENEWED FEB. 15, 1912.
1,042,153.
Patented Oct. 22, 1912.
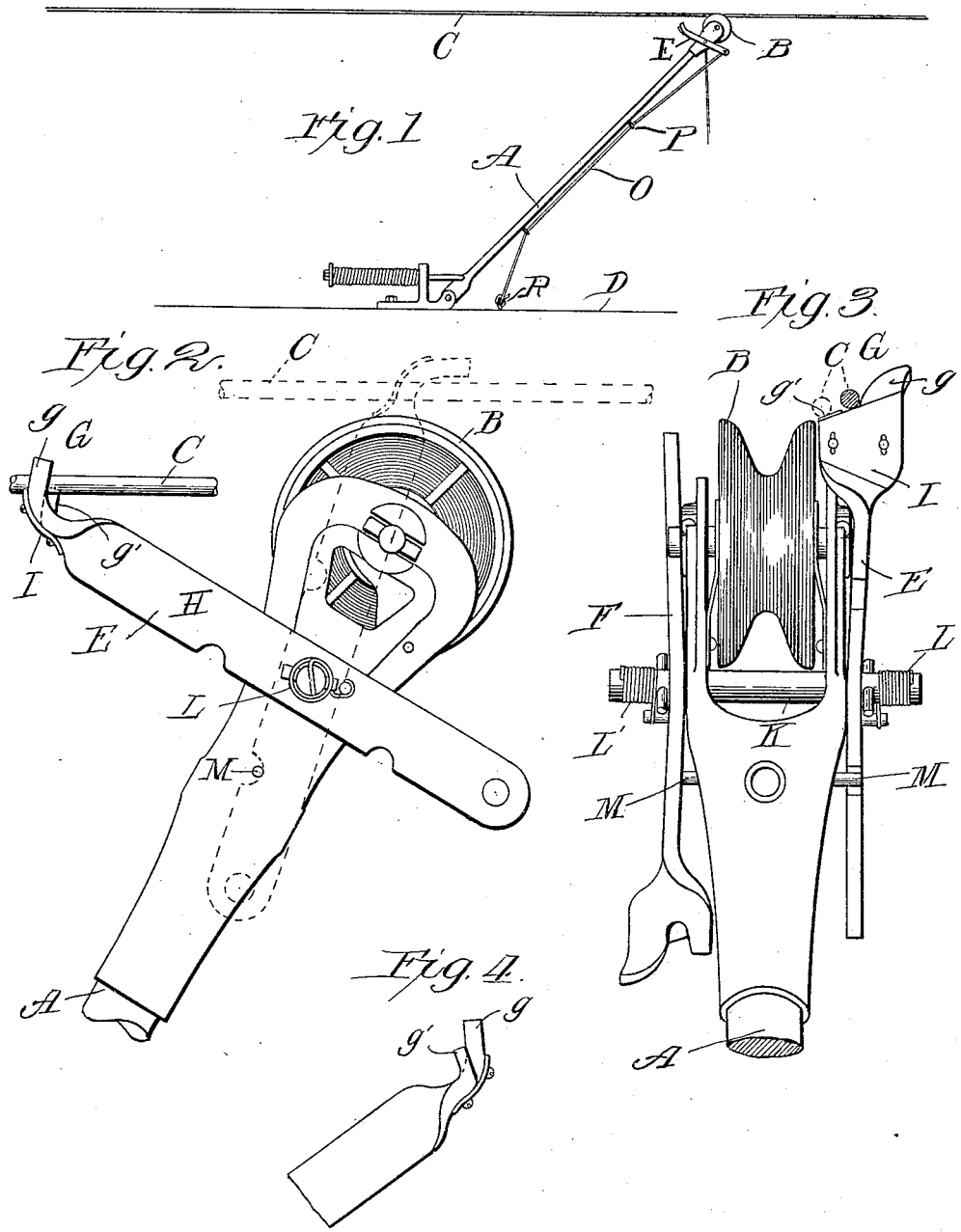

UNITED STATES PATENT OFFICE.

WALTER J. SCRIMSHAW, OF CHICAGO, ILLINOIS.

TROLLEY CATCHER AND REPLACER.

1,042,153.  Specification of Letters Patent.  Patented Oct. 22, 1912.

Application filed February 14, 1910, Serial No. 543,688. Renewed February 15, 1912. Serial No. 677,860.

*To all whom it may concern:*

Be it known that I, WALTER J. SCRIMSHAW, a subject of the King of England, residing at Chicago, county of Cook, State of Illinois, have invented a certain new and useful Improvement in Trolley Catchers and Replacers, and declare the following to be a full, clear, and exact description of the same, such as will enable others skilled in the art to which it pertains to make and use the same, reference being had to the accompanying drawings, which form a part of this specification.

My invention has for its object to produce a simple and effective device for catching trolleys when they jump from trolley wires and replacing them in operative relation to the wires.

The various features of novelty whereby my invention is characterized will hereinafter be pointed out with particularity in the claims; but for a full understanding of my invention and of its object and advantage, reference may be had to the following detailed description taken in connection with the accompanying drawing, wherein:

Figure 1 is a side view of a portion of the roof of a car showing thereon a trolley equipped in accordance with the present invention; Fig. 2 is a side view on an enlarged scale of the upper end of the trolley pole, two different positions of the parts being indicated respectively in full and in dotted lines; Fig. 3 is a view looking toward the right in Fig. 2, showing, however, different positions of some of the parts; Fig. 4 is a side view of a portion of one of the fork members.

Referring to the drawing, A represents a trolley pole having the usual grooved wheel B at the upper end. C is a trolley wire. D represents the roof of a car on which the pole is mounted. All these parts may take any usual or preferred forms since my invention is applicable to all forms thereof.

In accordance with my invention I arrange upon each side of the trolley wheel a device which will catch the trolley wire and return it to its proper position in the groove of the trolley wheel, one device or the other being operative according as the trolley wire drops down on one side or the other of the trolley wheel. Both of these devices are alike except that they are made in rights and lefts and a description of one will therefore suffice for both.

The two catching and replacing devices are indicated in the drawings at E and F. Referring particularly to one of these members, the member E, it will be seen that it consists of a fork G of peculiar construction having an elongated shank H which is pivotally supported in any suitable way upon the side of the trolley harp, suitable means being provided for yieldingly holding the fork somewhat in advance of the trolley wheel and at a level somewhat below the trolley wire. The fork is so constructed that in case the trolley wheel leaves the wire and starts to shoot upwardly past the wire on the side opposite that on which the fork lies, the wire will be caught by the fork and will be gripped by the same so that as the car moves onward the fork will be locked to the trolley wire and will be rotated about its point of support. In Fig. 2 the parts are shown in full lines in the positions which they occupy at the moment the trolley wire jumps into the fork; as the trolley moves forward the fork is arrested by the trolley wire and is gradually swung into the position indicated in dotted lines, lifting the trolley wire above the upper edge of the trolley wheel. This latter condition is illustrated at the right hand in Fig. 3. The fork is so shaped that when it is brought into the position indicated in dotted lines in Fig. 2 and at the right hand in Fig. 3, the trolley wire is no longer gripped but is supported in what may be termed a deflector so shaped that the trolley wire is caused to descend by gravity toward and into the groove in the trolley wheel. In Fig. 3 the wire is indicated in full lines in the position which it occupies at the moment it reaches its highest elevation, while in dotted lines it is shown on its way toward the wheel. The shaping of the fork to produce this result may be varied within wide limits, that shape which I have illustrated being the one which I prefer although not the only one which will accomplish the desired ends. It will be seen that the fork comprises two tines $g$ and $g'$, these tines extending approximately at right angles to the shank. The outermost tine, $g$, is longer than the other and is also somewhat farther away from the point of pivotal support than the other. It will be seen that by means of this construction, the trolley wire when it leaves the wheel may strike against the long tine and drop down into the jaw between the two tines. The tines may be slightly twisted so that they will grip the trolley wire or the jaw between the tines may be given any other suitable shape which will wedge the trolley wire in place therein with sufficient force to make it possible for the device to be rotated on its pivot as the car proceeds. It will be seen that as the device is rotated, the tines gradually turn from an approximately vertical position to one in which they are approximately horizontal, the grip on the trolley wire becoming gradually less until in the final position the wire is released and slides inwardly toward the trolley wheel over the shorter depressed tine. The guiding of the wire into the groove in the trolley wheel may be facilitated by providing a cam-shaped guide plate I on the back of the fork adjacent to the point of union between the two tines; this guide plate being made adjustable if desired so that it may be raised and lowered.

The members E and F, as heretofore stated, may be supported in any suitable way, this being conveniently accomplished by fixing in the trolley harp a rod or shaft K which projects therethrough on opposite sides thereof and journaling the members E and F upon the ends of this rod or shaft. Springs L and L' may be employed for the purpose of holding the fork shanks against stationary stops M when free to do so. In Fig. 3 the two devices are shown in opposite extreme positions, the member F being held against the stop by means of a spring, and the member E having been rotated against the tension of its springs through an angle of approximately 180 degrees until it strikes against the rear of the stop. It will be seen that the stops serve the double purpose of permitting an initial tension to be placed upon the springs and of arresting the rearward movement of the forks when they have reached the highest point on the wheel so that there will be no danger of letting the wire drop down beside the wheel instead of going into the groove.

When the trolley is working normally the members E and F are held in the position shown in Fig. 1 and approximately in position shown in Fig. 2; they being clear of the stops. The members E and F may be held in the normal positions in any suitable way preferably in such a manner that they will automatically adjust themselves as the angular position of the trolley pole varies so as always to maintain the proper positions with relation to the trolley wire. This may conveniently be accomplished by extending the shanks beyond the points of support and securing to these extended portions a cord or cable O which passes through an eye P on the trolley pole and extends down to the roof of the car where it is secured in any suitable manner as at R. When the parts are originally adjusted, the trolley wheel is placed in operative relation to the wire and the cord or cable is then adjusted so as to bring the forks in advance of the trolley wheel and slightly below the wire; the forks being held in this position against the tension of the springs. When the car travels under a stretch of wire which hangs lower than that in connection with which the original adjustment was made, the trolley pole is depressed and the cord or cable slackens a little so that the springs act to lower the forks slightly and thus keep them at the proper distance below the trolley wire. When a higher stretch of wire is approached the reverse action takes place and the forks are raised against the tension of the springs.

It will be seen that when the trolley wheel jumps from the wire, the wire will be caught in one fork or the other and will immediately be returned into the groove in the wheel, thereby obviating all the objections which have heretofore been incident to the jumping of the trolley wheel from the wire.

While I have illustrated and described in detail only a single preferred form of my invention I do not desire to be limited to the specific details so illustrated and described; but intend covering all constructions and arrangements which fall within the terms employed in the definitions of my invention constituting the appended claims.

What I claim is:

1. In combination, a trolley pole having a grooved contact wheel, an arm pivotally mounted on the pole on one side of the wheel, said arm having a fork at one end and the arm being of such length as to cause the fork to lie slightly above the top of the trolley wheel when the arm is in an upright position, a spring tending to hold said arm with the fork lying below the top of the trolly wheel, and the fork being arranged to grip a trolley wire and be sprung thereby into an upright position.

2. In combination, a trolley pole having a grooved contact wheel, an arm pivotally connected to the pole at one side of the wheel and having tines at one end thereof, said tines being so arranged that they lie substantially horizontal when the arm is in an upright position, and the tine nearest the contact wheel being nearer the pivotal axis of the arm than the other tine, and the length of the arm being such that when the arm is upright the tine nearest to the contact wheel is at about the level of the highest point of the wheel.

3. In combination, a trolley pole having a grooved contact wheel, forks lying on opposite sides of said wheel and pivotally connected to the pole, means for yieldingly holding the shanks of the forks at an angle to the pole with the tines in advance of the pivot, each of said forks being arranged to grip a wire falling into it and be swung upwardly thereby, and the tines of each fork being so shaped as to release the wire and guide it into the groove in the wheel when the fork has been lifted sufficiently to carry the wire above the top of the wheel.

4. In combination, a trolley pole having a grooved contact wheel, a fork pivotally connected to said pole on one side of the wheel, a spring for turning the fork in one direction, and means depending upon the angular position of the trolley pole for actuating said fork against the tension of said spring so as to adjust the fork in proper relation to the trolley wire for different angular positions of the trolley pole.

5. In combination, a trolley pole having a grooved contact wheel, a fork pivotally connected to the pole on one side of the wheel in position to engage the trolley wire when it jumps from the wheel toward the fork, a spring tending to hold the tines of the fork in advance of the wheel, and means for automatically shifting the fork when the trolley pole changes its angular position so as to maintain the tines of the fork in the proper position relative to the trolley wire regardless of the angle at which the pole is placed.

6. In combination, a trolley pole having a grooved contact wheel, a fork pivotally connected to the pole on one side of the wheel for engaging the trolley wire and delivering it to the groove in the wheel when the wire jumps from the wheel toward the fork, and a spring tending to hold the tines of the fork in advance of the wheel, said fork being arranged to grip the trolley wire when it falls between the tines thereof and be swung thereby about its pivot so as to elevate the tines and carry them back toward the wheel, and the tines being so shaped as to release the wire and direct it toward the groove in the wheel after the wire has been raised above the top of the wheel.

7. In combination, a trolley pole having a grooved contact wheel, a member pivotally connected to said trolley pole at one side of the wheel, said member having tines at one end, a spring for holding said member with the tines arranged in advance of the wheel the tines being arranged at a slight angle to the trolley wire as measured in a horizontal plane so as to cause them to grip the wire and be lifted thereby, and the tines being also so arranged that when said member is swung so as to bring them above the top of the wheel, the tine adjacent to the wheel is lower than the other tine so as to permit the wire to spring from between the tines into the groove in the wheel.

8. In combination, a trolley pole having a grooved contact wheel, a member pivotally connected to the pole at one side of the wheel and having tines at one end thereof, a spring tending to hold the tines in advance of the wheel, the parts being so proportioned that when the tines lie in advance of the wheel they present an upwardly opening jaw shaped to grip a trolley wire jumping from the wheel into the jaw so as to cause said member to be swung upwardly and rearwardly until the tines lie opposite the highest portion of the wheel, and when said member is swung so as to bring the tines beside the highest point of the wheel, the jaw is horizontal and the tine nearest the wheel is lower than the outer tine.

9. In combination, a trolley pole having a grooved contact wheel, a member pivotally connected to the pole at one side of the wheel and having tines at one end thereof, a spring tending to hold the tines in advance of the wheel, the parts being so proportioned that when the tines lie in advance of the wheel they present an upwardly opening jaw shaped to grip a trolley wire jumping from the wheel into the jaw so as to cause said member to be swung upwardly and rearwardly until the tines lie opposite the highest portion of the wheel, and when said member is swung so as to bring the tines beside the highest point of the wheel, the jaw is horizontal and the tine nearest the wheel is lower than the outer tine, and means for automatically adjusting said member when the trolley pole changes its angular position so as to maintain the tines in proper relation to the trolley wire.

In testimony whereof, I sign this specification in the presence of two witnesses.

WALTER J. SCRIMSHAW.

Witnesses:
WM. F. FREUDENREICH,
H. S. GAITHER.

Copies of this patent may be obtained for five cents each, by addressing the "Commissioner of Patents, Washington, D. C."